(12) United States Patent
Haas et al.

(10) Patent No.: US 6,615,036 B1
(45) Date of Patent: Sep. 2, 2003

(54) METHOD AND APPARATUS FOR STORING DATA WITHIN A COMMUNICATION SYSTEM

(75) Inventors: Kenneth A. Haas, Sleepy Hollow, IL (US); H. S. Jang, Seoul (KR)

(73) Assignee: Motorola, Inc., Schaumburg, IL (US)

( * ) Notice: Subject to any disclaimer, the term of this patent is extended or adjusted under 35 U.S.C. 154(b) by 343 days.

(21) Appl. No.: 09/597,609

(22) Filed: Jun. 20, 2000

Related U.S. Application Data

(60) Provisional application No. 60/194,413, filed on Apr. 4, 2000.

(51) Int. Cl.[7] .................................................. H04M 3/53
(52) U.S. Cl. ........................................ 455/413; 455/466
(58) Field of Search ................................. 455/412, 413, 455/466; 379/88.11, 88.12, 88.1

(56) References Cited

U.S. PATENT DOCUMENTS 5,797,103 A   8/1998 Duda
6,240,299 B1 * 5/2001 Song ........................... 455/550
6,298,231 B1 * 10/2001 Heinz ......................... 455/413
6,381,465 B1 * 4/2002 Chern et al. ................. 455/466

* cited by examiner

Primary Examiner—Lee Nguyen
(74) Attorney, Agent, or Firm—Kenneth A. Haas; Jeffrey K. Jacobs

(57) ABSTRACT

When a remote unit (113) accesses a cellular communication system (100) via an uplink communication signal (119), a Mobile Switching Center (104) notifies a voice-mail system (114) that the remote unit (113) is available for communication. The voice-mail system (114) then establishes a connection via a base station (102) and the downlink communication signal (116), to the remote unit (113). Once connection has been established between the voice-mail system (114) and the remote unit (113), the remote unit (113) downloads the voice-mail message from voice-mail system (114) for storage internal to the remote unit (113).

2 Claims, 6 Drawing Sheets

METHOD AND APPARATUS FOR STORING DATA WITHIN A COMMUNICATION SYSTEM

FIELD OF THE INVENTION

The present invention relates generally to data storage and, in particular, to a method and apparatus for storing data within a communication system.

BACKGROUND OF THE INVENTION

Within a typical cellular communication system, each subscriber who has subscribed to voice-mail services is assigned a "mailbox" on a disk of a voice mail system (VMS). Messages are stored on the disk from callers when the called subscriber does not answer. These messages are typically stored in an analog format, and require large amounts of storage space for proper storage.

Because cellular communication systems typically have thousands of customers, very large amounts of storage space are required to store voice-mail messages for the subscribers within the communication system. Even with large amounts of storage space, customers are usually allowed to store only a limited amount of messages so that the amount of messages stored does not exceed the amount of storage space within the VMS. Because of this, a need exists for a method and apparatus for storing data within a communication system that does not require large amounts of storage space at a VMS, and increases the amount of memory available to an individual subscriber.

DETAILED DESCRIPTION OF THE PREFERRED EMBODIMENTS

To address the above-mentioned need, a method and apparatus for storing data within a communication system is provided herein. In accordance with the invention, when a remote unit accesses a cellular communication system via an uplink communication signal a Mobile Switching Center notifies a voice-mail system that the remote unit is available for communication. The voice-mail system then establishes a connection via a base station and the downlink communication signal to the remote unit. Once connection has been established between the voice-mail system and the remote unit, the remote unit downloads the voice-mail message from voice-mail system for storage internal to the remote unit.

By downloading the voice-mail message to the remote unit, the remote unit can access the voice-mail message by accessing an internal memory. Because of this, memory at VMS 114 can be freed up to store other voice-mail messages, greatly reducing the chance that a customer will exceed their limited memory allocation. Additionally, because thousands of messages are downloaded and stored on subscriber units, the amount of storage space required to store voice-mail messages can be greatly reduced.

The present invention encompasses a method for storing data within a remote unit, the method comprising the steps of accessing a communication system and receiving a voice-mail message via a downlink communication signal. The voice-mail message is then stored within a memory internal to the remote unit to be accessed by a user at a later time.

The present invention additionally encompasses a method for storing data within a voice-mail system (VMS), the method comprising the steps of receiving an undelivered call and storing a voice-mail message in internal memory. A notification is received that a remote unit has accessed a cellular communication system and the voice-mail message is transmitted to the remote unit for storage within memory internal to the remote unit.

Finally, the present invention encompasses a remote unit comprising a transceiver for receiving a voice-mail message via a downlink communication a signal and internal storage for storing the voice-mail message internal to the remote unit to be accessed by a user at a later time.

Figure 1:
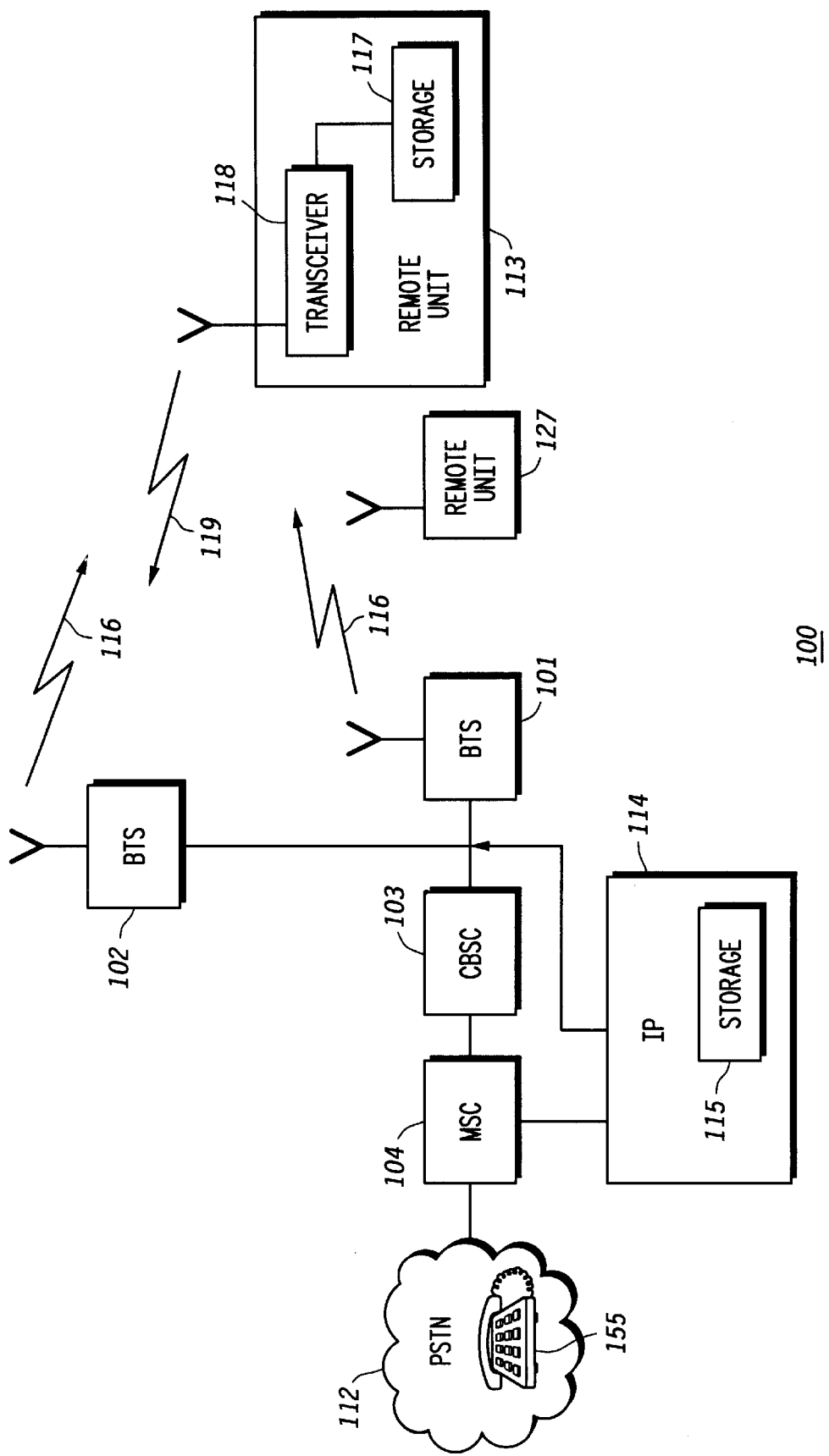
FIG. 1 is a block diagram of a communication system in accordance with the preferred embodiment of the present invention.

Turning now to the drawings, where like numerals designate like components, FIG. 1 illustrates a wireless communication system in accordance with the preferred embodiment of the present invention. In the preferred embodiment of the present invention, communication system 100 utilizes a Code Division Multiple Access (CDMA) system protocol as described in Cellular System Remote unit-Base Station Compatibility Standard of the Electronic Industry Association/Telecommunications Industry Association Interim Standard 95 (TIA/EIA/IS-95A), which is incorporated by reference herein. (EIA/TIA can be contacted at 2001 Pennsylvania Ave. NW Washington D.C. 20006). In alternate embodiments communication system 100 may utilize other analog or digital cellular communication system protocols such as, but not limited to, the Narrowband Advanced Mobile Phone Service (NAMPS) protocol, the Advanced Mobile Phone Service (AMPS) protocol, the Global System for Mobile Communications (GSM) protocol, the Personal Digital Cellular (PDC) protocol, or the United States Digital Cellular (USDC) protocol.

Communication system 100 includes a number of network elements such as base station 102, base station 102, remote unit 113, Centralized Base Station Controller (CBSC) 103, and Mobile Switching Center (MSC) 104, and Intelligent Peripheral (IP) 114. In the preferred embodiment of the present invention, IP 114 comprises a VMS, however, IP 114 may comprise other data storage devices such as, but not limited to a hard disk drive, compact disk storage, . . . etc. It is contemplated that network elements within communication system 100 are configured in well known manners with processors, memories, instruction sets, and the like, which function in any suitable manner to perform the function set forth herein.

Operation of communication system 100 occurs as follows: A call attempt is made to remote unit 113. The call attempt may originate from a Public Switched Telephone Network (PSTN) (i.e. from communication unit 155) or may originate from cellular system 100 (i.e. from remote unit 127). MSC 104 determines the availability of remote unit 113 and, if necessary, attempts to locate remote unit 113 via downlink communication signal 116 sent to the last base station that remote unit 113 was in communication with. If remote unit 113 is unavailable, MSC 104 reroutes the call to VMS 114. If remote unit 113 has subscribed for voice-mail services, VMS 114 directs the calling party to leave a message for remote unit 113. If a message has been left for remote unit 113, VMS 114 stores the message and sends a trigger message to MSC 104 informing MSC 104 that VMS 114 should be notified when remote unit 113 next accesses cellular system 100.

When remote unit 113 accesses cellular system 100 (e.g. location registration, originating call attempt, releasing an existing call . . . etc.) via uplink communication signal 119, MSC 104 notifies VMS 114 that remote unit 113 is available for communication. VMS 114 then establishes a connection via base station 102 and downlink communication signal 116, to remote unit 113. Once connection has been established between VMS 114 and remote unit 113, remote unit 113 downloads the voice-mail message from VMS 114 for storage internal to remote unit 113. VMS 114 then informs remote unit 113 that a voice-mail message has been left via an indication message. In a preferred embodiment the indication message consists of a predetermined text message (e.g., "you have voice mail") transmitted to remote unit 113 and displayed by remote unit 113 on an alpha-numeric display. The sending of a predetermined text message is described in detail in U.S. Pat. No. 5,797,103 issued to Michael Duda, and assigned to the assignee of the present invention. (U.S. Pat. No. 5,797,103 is expressly incorporated by reference herein). The voice-mail message is then deleted from the VMS's internal memory.

By downloading the voice-mail message to remote unit 113, memory at VMS 114 can be freed up to store other voice-mail messages, greatly reducing the chance that a customer will exceed their limited memory allocation. Additionally, because thousands of messages are downloaded and stored on subscriber units, the amount of storage space required to store voice-mail messages can be greatly reduced.

Figure 2:
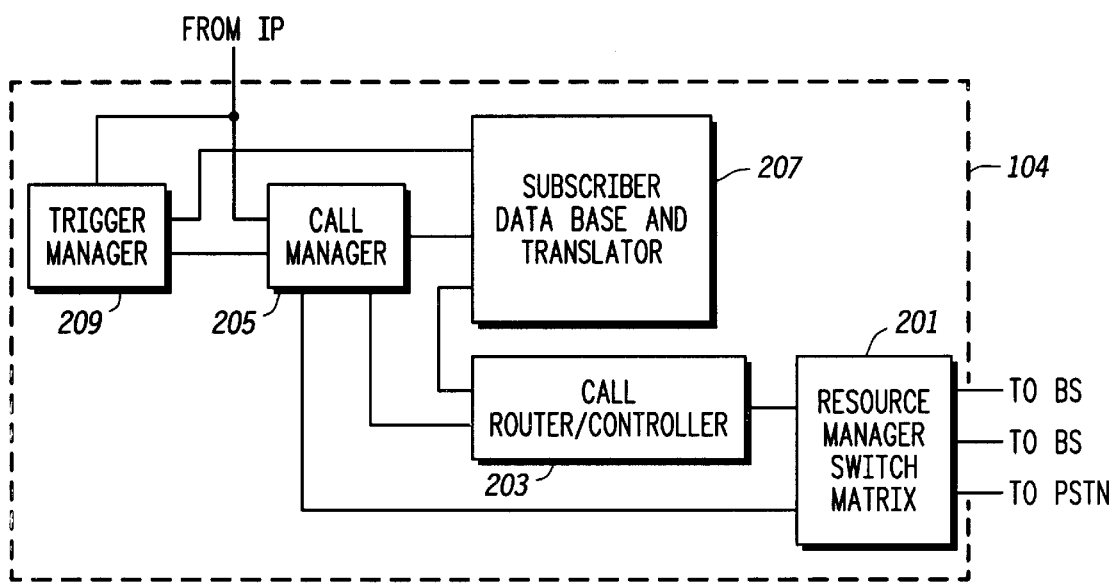
FIG. 2 is a block diagram of the mobile switching center of FIG. 1 in accordance with the preferred embodiment of the present invention.

FIG. 2 is a block diagram of MSC 104 of FIG. 1 in accordance with the preferred embodiment of the present invention. MSC 104 comprises trigger manager 209, call manager 205, subscriber database/translator 207, call router/controller 203, and resource manager/switch matrix 201. In a preferred embodiment, resource manager/switch matrix 201 is coupled to both call router/controller 203 and call manager 205 and call router/controller 203 is suitably coupled to both call manager 205 and subscriber database/translator 207. Resource manager/switch matrix 201 has outputs to base stations 102 and 105 and to PSTN 112. Trigger manager 209 (preferably a microprocessor based controller) is coupled to both call manager 205 and subscriber database/translator 207. Call manager 205, subscriber database/translator 207, and router/controller 203 are preferably microprocessor based controllers as described in Bellcore publication "Advanced Intelligent Network (AIN) 0.2 Switch—Intelligent Peripheral Interface (IPI) Generic Requirements" dated November, 1993.

Figure 3:
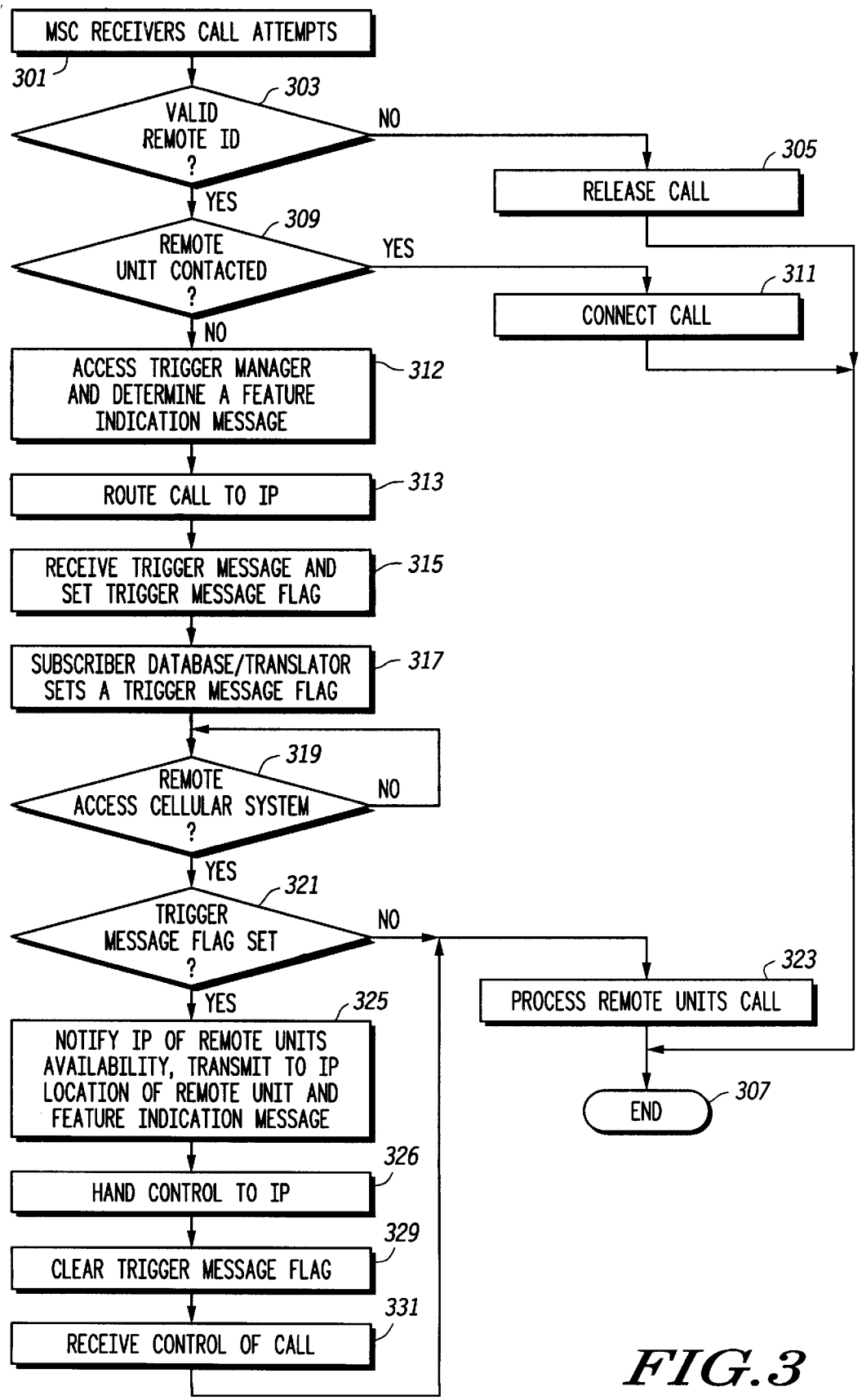
FIG. 3 is a flow chart showing operation of the mobile switching center of FIG. 1 in accordance with the preferred embodiment of the present invention.

FIG. 3 is a flow chart illustrating a particular embodiment of operating MSC 104 of FIG. 1 and FIG. 2. The logic flow begins at step 301, where MSC 104 receives a call attempt. Next, at step 303 call manager 205 accesses subscriber database/translator subsystem 207 and determines if a valid mobile identification was supplied by the call attempt. If, at step 303, subscriber database/translator 207 determines that the mobile identification is invalid, then at step 305, MSC 104 releases the call attempt, and the logic flow ends at step 307. If, at step 303, subscriber database/translator 207 determines that the mobile identification is valid, then at step 309, call manager 205 attempts to contact remote unit 103. In the preferred embodiment, the step of contacting remote unit 103 is accomplished via downlink communication signal 116 which is transmitted from the last base station that remote unit 103 communicated with. In situations where remote unit 103 is involved in a call, the step of contacting remote unit 103 is accomplished via down link communication on the traffic channel currently being utilized by remote unit 103.

Continuing, if at step 309, call manager 205 successfully contacts remote unit 103, then at step 311, the call is connected, and the logic flow ends at step 307. If at step 309, call manager 205 fails to contact remote unit 103, then at step 312 call manager 205 accesses trigger manager 209 where trigger manager determines a feature-indication message (e.g., "you have a voice-mail message") and a corresponding time for the message to be sent to remote unit 103. In a preferred embodiment the feature-indication message consists of a text message that is sent to remote unit 103 via a short message service the next time remote unit 103 accesses communication system 100.

Continuing, at step 313, the undelivered call is rerouted to VMS 114. At step 315 MSC 104 receives a trigger message from VMS 114 and sets a trigger message flag instructing MSC 104 to notify VMS 114 the next time remote unit 103 accesses cellular system. Next, at step 317, subscriber database/translator 207 sets a trigger message flag (in a preferred embodiment, the trigger message flag is simply a bit stored in memory) to notify VMS 114 the next time remote unit 103 accesses cellular system. At step 319 call manager 205 determines if remote unit 103 has accessed cellular system. In the preferred embodiment, access can be accomplished by a location registration, originated call attempt, or releasing an existing call.

If at step 319 it is determined that remote unit has not accessed cellular system, the logic flow returns to step 319, otherwise the logic flow continues to step 321 where subscriber database/translator 207 checks to see if the trigger message flag has been set to notify VMS 114 of remote unit's 103 access to cellular system 100. If no trigger message flag has been set, then at step 323 call manager 205 continues processing the system access, and the logic flow ends at step 307. If at step 321 a trigger message flag has been set, then at step 325 call manager 205 notifies VMS 114 that remote unit 103 is available and transmits to VMS 114 the location (i.e. current base station) of remote unit 103 along with the feature-indication message. Next, at step 326, call manager 205 hands control of remote unit 103 to VMS 114 which transmits a feature-indication message and the voice-mail message to remote unit 103. In the preferred embodiment of the present invention the voice-mail message is stored within memory 117. At step 329 subscriber database/translator 207 clears the trigger message flag. The logic flow continues to step 331, where call manager 205 receives control of remote unit 103 from VMS 114, and continues processing remote unit's 103 system access. It should be noted that at step 326 the voice-mail message is transmitted to remote unit 103 without the user of remote unit 103 requesting the message be sent. The message is sent automatically when remote unit 103 is available without the user requesting the message.

Figure 4:
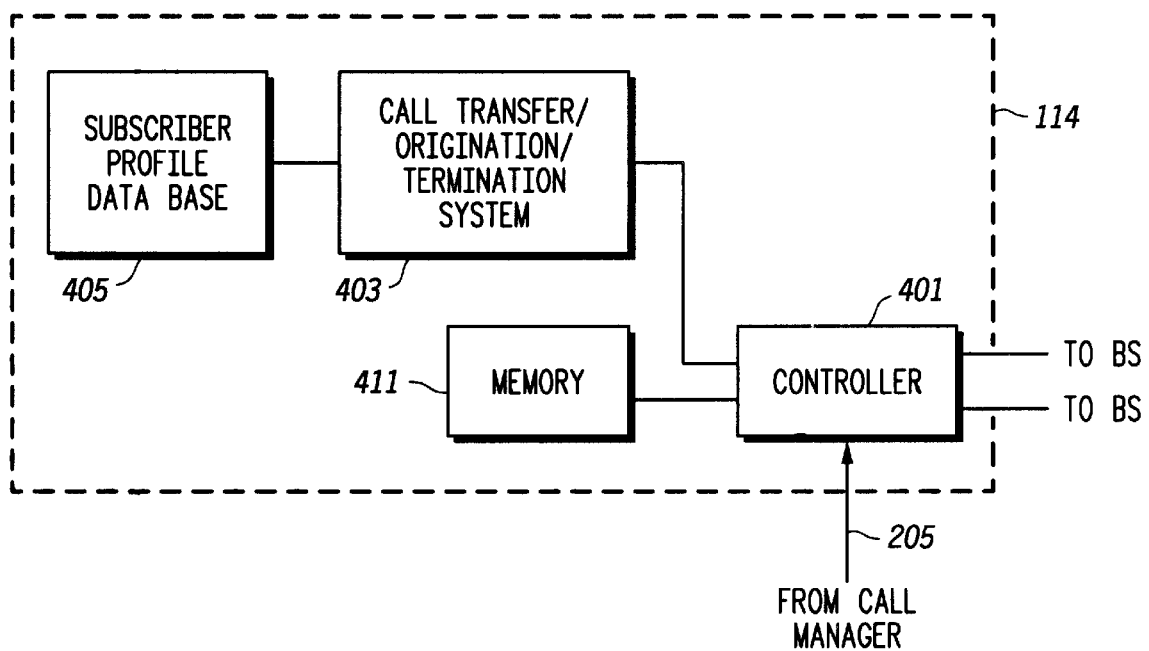
FIG. 4 is a block diagram of the intelligent peripheral of FIG. 1 in accordance with the preferred embodiment of the present invention.

Referring to FIG. 4, a block diagram of a preferred embodiment of VMS 114 of FIG. 1 is illustrated. VMS 114 includes controller 401 (such as a microprocessor based controller), a memory serving as subscriber profile database 405, call transfer/origination/termination (CTOT) system 403, and memory 115. In a preferred embodiment controller 401 has outputs to base station 102 and base station 105 and has an input from call manager 205. Controller 401 is suitably coupled to CTOT system 403 with CTOT system 403 coupled to subscriber profile database. Additionally, memory 115 is coupled to caller controller 401. Controller 401, subscriber profile database 405, and (CTOT) system 403 are preferably those as described in Bellcore publication "Advanced Intelligent Network (AIN) 0.2 Switch— Intelligent Peripheral Interface (IPI) Generic Requirements" dated November, 1993. This document can be obtained from Bellcore Customer Service, located at 8 Corporate Place, 3C183, Piscataway, N.J. 08854-4156.

Figure 5:
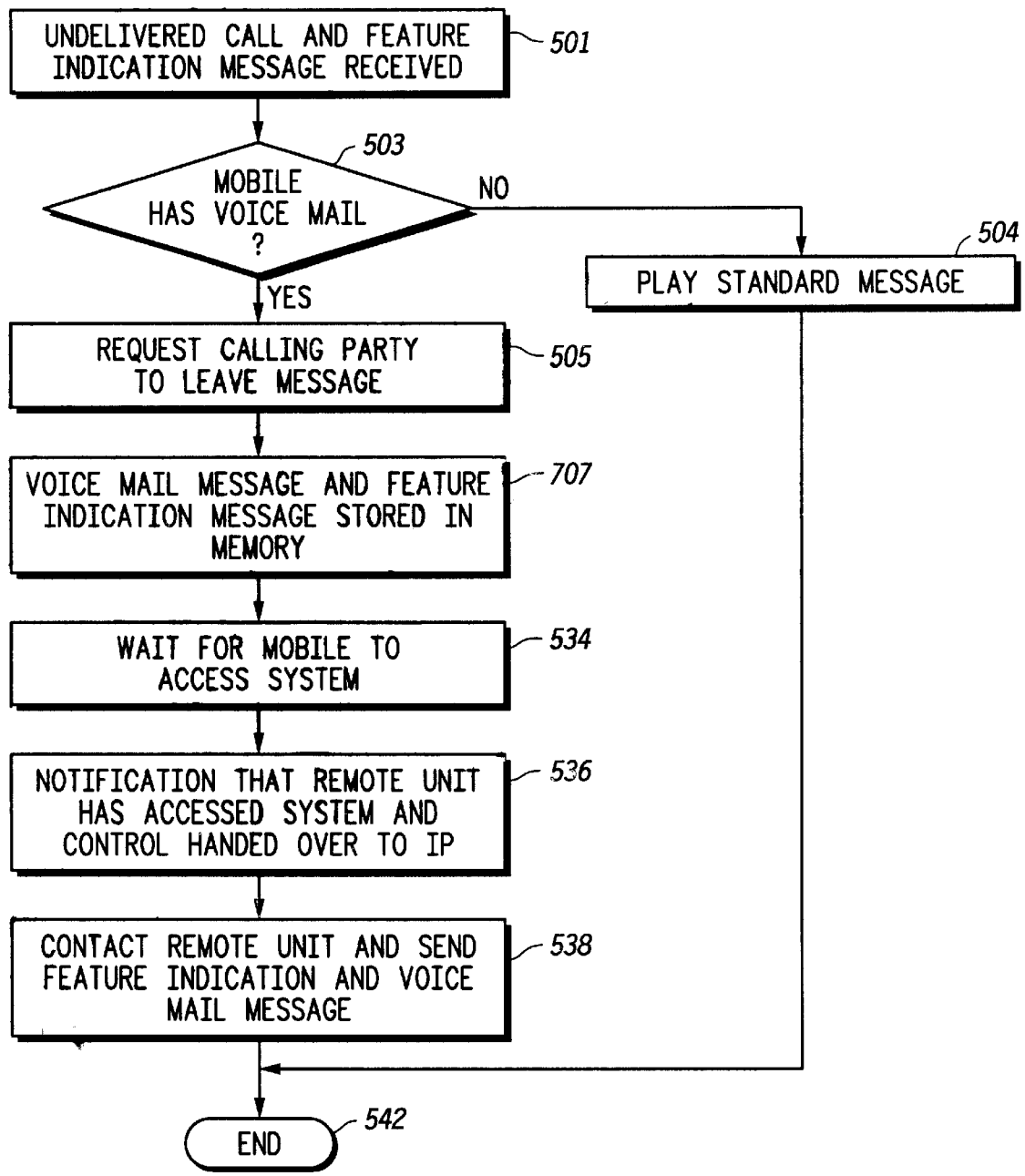
FIG. 5 is a flow chart showing operation of the intelligent peripheral of FIG. 1 in accordance with the preferred embodiment of the present invention.

FIG. 5 is a flow chart illustrating a method of operating VMS 114 of FIG. 1 in accordance with the preferred embodiment of the present invention. The logic flow begins at step 501 where controller 401 receives a rerouted undelivered call and a feature-indication message from MSC 104. At step 503, controller 401 accesses CTOT system 403 which determines if remote unit 103 has voice-mail capabilities. In the preferred embodiment, CTOT system 403 accomplishes this by accessing the subscriber profile data base 405 that contains the services that remote unit 103 has associated with it. If, at step 503 it is determined that remote unit 103 has voice-mail capabilities, then at step 505 CTOT system 403 requests the calling party to leave a message and the logic flow continues to step 507 where the voice-mail message and feature-indication message is stored in memory 115. If, at step 503 it is determined that remote unit 103 has no voice-mail capabilities, then the logic flow continues to step 504 where a standard message indicating the unavailability of remote unit 103. The logic flow then continues to step 534 where controller 401 waits for remote unit 103 to access cellular system 100.

At step 536 MSC 104 notifies controller 401 that remote unit 103 has accessed cellular system 100 and MSC 104 hands control of remote unit 103 to controller 401. Next, at step 538, controller 401 contacts remote unit 103 via base station 102 and downlink communication signal 116. At this point controller 401 supplies remote unit 103 the feature-indication message and the voice-mail message. As discussed above, in a preferred embodiment the feature-indication message may be supplied via a short message service or "Alert w/Info" depending on the communication system protocol. Controller 401 accomplishes this by retrieving the feature indication and voice-mail messages from memory 115 and supplying the feature-indication message and voice-mail message to base station 102 which transmits both to remote unit 103 via downlink communication signal 116. In the preferred embodiment of the present invention the feature-indication message is displayed on an alpha-numeric display screen, and the voice-mail message is stored within internal memory 117 in a digital format (e.g., 8 kb/s QCELP format). In other words, the voice-mail message is stored within memory 115 in a first format (analog), and stored within memory 117 in a second format (digital), although in an alternate embodiment, these formats may be identical. At step 542 the logic flow ends.

As mentioned above, by downloading the voice-mail message to remote unit 113, memory at VMS 114 can be freed up to store other voice-mail messages, greatly reducing the chance that a customer will exceed their limited memory allocation. Additionally, because thousands of messages are downloaded and stored on subscriber units, the amount of storage space required to store voice-mail messages can be greatly reduced.

Figure 6:
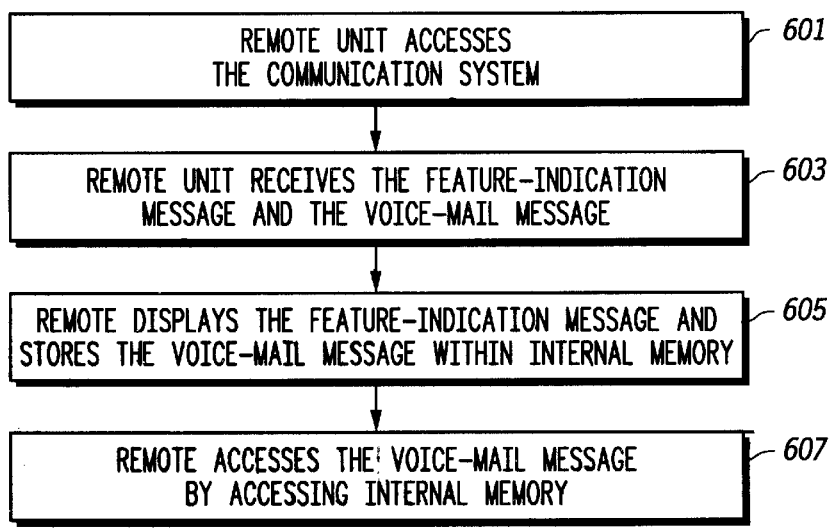
FIG. 6 is a flow chart showing operation of the remote unit of FIG. 1 in accordance with the preferred embodiment of the present invention.

FIG. 6 is a flow chart showing operation of remote unit 113 in accordance with the preferred embodiment of the present invention. The logic flow begins at step 601 where remote unit 113 accesses communication system 100. At step 603, remote unit 113 receives (via transceiver 118) downlink signal 116. In the preferred embodiment of the present invention downlink signal 116 contains a feature-indication message and a voice-mail message. At step 605 remote unit 113 displays the feature-indication message to the user, and stores the voice-mail message within internal storage 117. In the preferred embodiment of the present invention the voice-mail message is stored in 8 kb/s QCELP format to be accessed by the user at a later time. Finally, at step 607, remote unit 113 accesses the voice-mail message by accessing internal memory 117.

Figure 7:
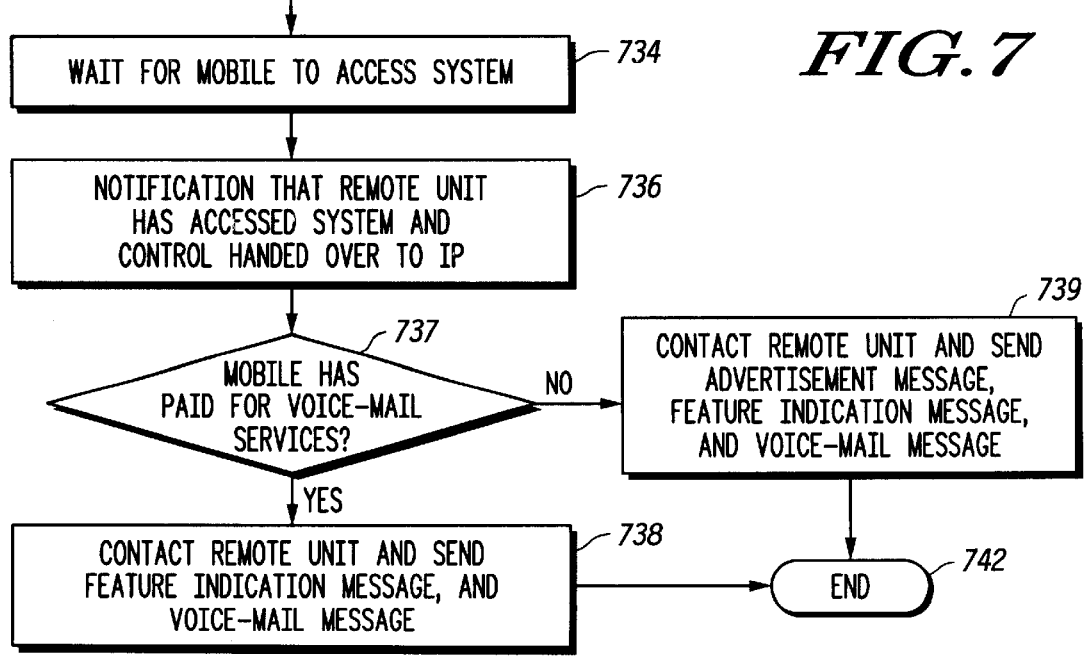
FIG. 7 is a flow chart showing operation of the intelligent peripheral of FIG. 1 in accordance with an alternate embodiment of the present invention.

FIG. 7 is a flow chart illustrating a method of operating VMS 114 of FIG. 1 in accordance with an alternate embodiment of the present invention. In the alternate embodiment of the present invention, voice-mail capabilities are provided to all remote units within communication system 100, however those remote units that have not "subscribed" for the service will have a short advertisement message pre-pended to their voice mail message. Thus in accordance with the alternate embodiment of the present invention, extra revenue may be had by selling advertisement messages that are pre-pended to the voice-mail messages.

The logic flow begins at step 701 where controller 401 receives a rerouted undelivered call and a feature-indication message from MSC 104. At step 705 CTOT system 403 requests the calling party to leave a message and the logic flow continues to step 707 where the voice-mail message and feature-indication message is stored in memory 115. The logic flow then continues to step 734 where controller 401 waits for remote unit 103 to access cellular system 100.

At step 736 MSC 104 notifies controller 401 that remote unit 103 has accessed cellular system 100 and MSC 104 hands control of remote unit 103 to controller 401. Next, at step 737 it is determined if the remote unit has paid for voice-mail services, and if so, the logic flow continues to step 738 where 738, controller 401 contacts remote unit 103 via base station 102 and downlink communication signal 116. At this point controller 401 supplies remote unit 103 the feature-indication message and the voice-mail message. Controller 401 accomplishes this by retrieving the feature indication and voice-mail messages from memory 115 and supplying the feature-indication message and voice-mail message to base station 102 which transmits both to remote unit 103 via downlink communication signal 116.

If at step 737 it is determined that the remote unit has not paid for voice-mail services, the logic flow continues to step 739 where controller 401 supplies remote unit 103 the feature-indication message, an advertisement message, and the voice-mail message. In the preferred embodiment of the present invention the feature-indication message is displayed on an alpha-numeric display screen, and the voice-mail message and advertisement message is stored within internal memory 117 in a digital format (e.g., 8 kb/s QCELP format). In other words, the voice-mail message is stored within memory 115 in a first format (analog), and stored within memory 117 in a second format (digital), although in an alternate embodiment, these formats may be identical. At step 742 the logic flow ends.

As mentioned above, by downloading the voice-mail message to remote unit 113, memory at VMS 114 can be freed up to store other voice-mail messages, greatly reducing the chance that a customer will exceed their limited memory allocation. Additionally, because thousands of messages are downloaded and stored on subscriber units, the amount of storage space required to store voice-mail messages can be greatly reduced.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method for storing data within a remote unit, the method comprising the steps of:

accessing a communication system;

receiving a voice-mail message via a downlink communication signal;

storing the voice-mail message within a memory internal to the remote unit to be accessed by a user at a later time;

receiving an advertisement message via the downlink communication signal; and storing the advertisement message within the memory internal to the remote unit to be accessed by a user at a later time.

2. A method for storing data within a voice-mail system (VMS), the method comprising the steps of:

receiving an undelivered call;

storing a voice-mail message in internal memory;

receiving a notification that a remote unit has accessed a cellular communication system;

transmitting the voice-mail message to the remote unit for storage within memory internal to the remote unit; and transmitting an advertisement message pre-pended to the voice-mail message.

* * * * *